UNITED STATES PATENT OFFICE.

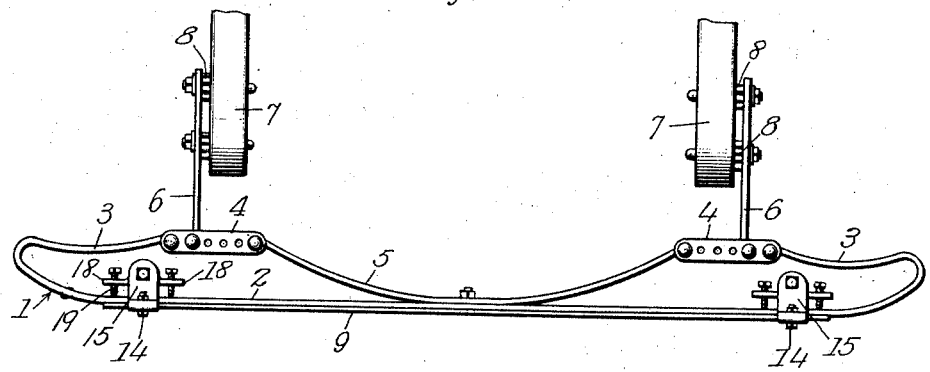
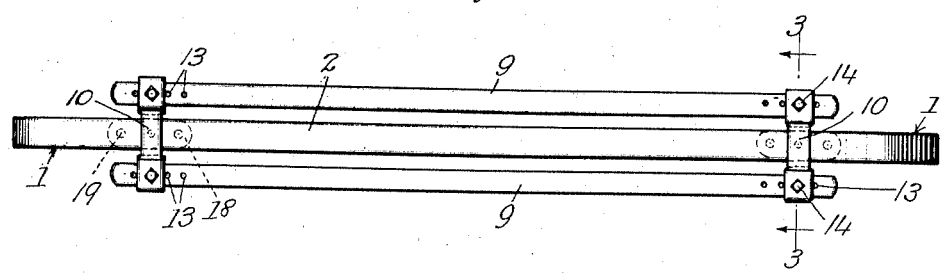
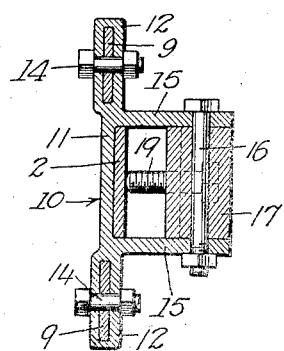 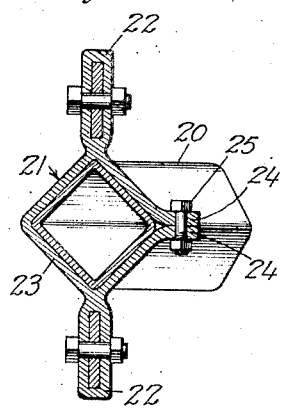

ALLAN L. McGREGOR, OF CHICAGO, ILLINOIS.

AUTOMOBILE-BUMPER.

1,366,194.   Specification of Letters Patent.   Patented Jan. 18, 1921.

Application filed March 24, 1920. Serial No. 368,463.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers, and more particularly to attachment for various makes and kinds of automobile bumpers having a single bar serving as the impact member, such attachment being in the nature of an auxiliary impact member adapted to be attached for the purpose of providing an impact surface of increased area.

The object of the invention is to provide an attachment of the character hereinbefore suggested, whereby the ordinary single bar bumper may be converted into a bumper having two or more parallel members constituting the impact portion thereof, by attaching to the single impact bar the auxiliary structure, thus providing the additional protection without replacing the bumper already in use with an entirely new bumper in which the desirable features are permanently incorporated. A further object of the invention is to provide attaching means for the auxiliary impact members, which will permit the latter to be attached to various makes of bumpers, and also, to provide a sufficient degree of adjustment to enable the auxiliary impact member to be attached to bumpers varying in horizontal dimension.

The features embodied in my invention are hereinafter more fully described, and in connection with the accompanying drawing, in which—

Figure 1 is a top plan view of a bumper attached to the frame members of a vehicle, and having the auxiliary impact member attached to the forward impact bar thereof.

Fig. 2 is a front view showing the auxiliary impact member attached to the single impact bar of the bumper.

Fig. 3 is an enlarged view in cross section of an attaching bracket taken on line 3—3 of Fig. 2, and;

Fig. 4 is an enlarged view in vertical section of a modification of the connecting brackets shown in Fig. 3, and designed for attaching the auxiliary impact member to an impact bar of the hollow and rigid type.

In Figs. 1, 2, and 3, I have illustrated the auxiliary impact member in connection with, and as attached to a bumper 1 constructed of resilient bar material, made so that the structure is yieldable in a horizontal direction, but is relatively non-yieldable in a vertical direction. The principal part of the bumper to which my attachment may be secured is a single impact bar 2, preferably extending the full width of the bumper, and located in front of such parts as may be employed for connecting the bumper to the vehicle frame member. The particular bumper illustrated comprises the said impact bar 2 having its end portions curving rearwardly to the extremities of the bumper, and at that point bent in U-shape to provide the rearwardly disposed portions 3—3. Connected with the ends of the portions 3—3 are link members 4—4, which are likewise connected to the ends of an intermediate equalizing bar 5. The link members 4—4 are attached to the forward ends of the connecting bars 6—6, which in turn are attached at their rear ends to the vehicle frame members 7—7, by means of suitable clamping bolts 8—8.

Referring now to the auxiliary impact member, the same comprises in general two resilient bars 9—9, arranged in parallel relation to each other, and connected together at their ends by means of transverse connecting or attaching members 10—10. These attaching members are generally constructed to support the ends of the bars 9—9 in parallel and spaced relation to each other, and to be connected to the single impact bars 2—2 intermediate to their ends, thereby locating the bars 9—9 above and below said single impact bar 2, and spaced a short distance therefrom and lying substantially in the plane thereof. Referring to Fig. 3, each of the connecting members 10 consist of a vertically arranged member 11 having enlarged end portions 12—12, provided with transverse slots therethrough adapted to receive the end portions of the bars 9—9, there being formed in said end portions a series of longitudinally arranged holes 13, any one of which may register with a hole extending through said end portions, and adapted to receive bolts 14—14. It is manifest that by this arrangement the distance separating the connecting members 10—10 may be varied, and likewise the points of connection between said connecting members and the impact bar 2, thus affording a considerable degree of adjustability in attaching the auxiliary impact member to the impact bar 2 of the bumper. Formed integrally with the vertical portion 11 of each connecting member are two transverse flanges 15—15, projecting rearwardly from said portion 11, and in parallel spaced relation to each other, each of said flanges joining the vertical portion 11 immediately inward from the enlarged extremities 12—12. The vertical distance between flanges 15—15 is substantially equal to the vertical dimension of the impact bar 2, the same being adapted to be embraced by said flanges, and to engage the rear face of the vertical portion 11 of the member 10. Extending vertically through the said flanges 15—15 is a bolt 16 pivotally supporting a block 17 between said flanges 15—15 and provided with laterally extending arms 18—18 (Fig. 1). Mounted in these arms 18—18 are set screws 19—19, which bear against the rear face of the impact bar 2 and serve to securely connect the attaching members 10—10 to the said bar 2, this being done by simply tightening the set screws in the usual manner.

By providing the particular type of connecting member described, a desirable means of attachment is afforded, which is particularly adapted for use in connection with a resilient impact member, in that any distortion of said impact member would necessarily affect the bar at the point of connection. By providing the block 17 located intermediate the plate 11 and the set screws 19, the connecting members are capable of adjusting themselves to the movement of the impact bar without becoming loosened.

In Fig. 4, is illustrated a modified form of connecting member adapted for use in attaching the auxiliary impact member to the so-called rigid or non-yielding type of impact bar, such as the hollow rectangular shaped member 20 illustrated. The connecting member 21 of modified form is provided with slotted end portions 22—22 similar in all respects to the corresponding portions of the connecting member heretofore described; in fact, the modification exists only in the intermediate portion 23 which assumes the form of a split collar, shaped to correspond with that of the bar 20, and as before suggested is split at the rear portion thereof and provided with abutting flanges 24 through which a bolt 25 extends. This type of connecting member may obviously be further modified to such an extent that the intermediate portion 23 can assume the form of any form of impact bar, whether it be round or of any other shape.

It is clear from the description of the device embodying my invention that it permits the attachment of one or more auxiliary impact members to any type of so-called single bar bumper, irrespective of the construction of the impact bar. It is further obvious that by employing the auxiliary impact member, the advantages of a wider impact surface is secured without replacing the entire bumper with a new one having at least two bars forming the impact member.

The features of my invention are hereinafter more fully set forth in the appended claims, and in this connection, it is to be understood that the attachment embodying the features of my invention may be further modified without departing from the spirit thereof.

I claim as my invention:

1. An attachment for a bumper having a single bar comprising an auxiliary impact bar, and attaching means for positioning said bar in vertically spaced relation to said single impact bar.

2. An attachment for a bumper having a single impact bar comprising an auxiliary impact bar adapted to be detachably connected to said single bar in parallel relation thereto.

3. An attachment for a bumper having a single impact bar comprising a plurality of auxiliary impact bars, and attaching members detachably connected to said impact bar and connected with the ends of said auxiliary bars.

4. An attachment for a bumper having a single impact bar comprising a plurality of auxiliary impact bars, and attaching members adjustably connecting the ends of said auxiliary impact bars, and adapted for detachable connection with said single impact bar.

5. An attachment for a bumper having a single impact bar comprising auxiliary impact bars, attaching members joining the ends of said impact bars and having detachable connection with said impact bar to support said auxiliary impact bars in parallel and vertically spaced relation to said single impact bar.

6. An attachment for a bumper having a single bar comprising an auxiliary impact bar, and an attaching member having a portion adapted for detachable connection with said single impact bar and a slotted portion to receive said auxiliary bar.

7. An attachment for a bumper having a single impact bar comprising an auxiliary impact bar adapted for attachment to said single bar in parallel relation thereto, and attaching members, having a portion secured to said single impact bar and a slotted portion to receive the ends of said auxiliary bar, and to have laterally adjustable connection therewith.

8. An attachment for a bumper having a single impact bar comprising a plurality of auxiliary impact bars, and attaching members for securing the ends of said auxiliary bars in parallel and vertically spaced relation to said impact bar, each of said attaching members comprising end portions connected with said auxiliary bars, and an intermediate portion having flanges embracing said single impact bar, a block pivotally supported between said flanges, and a set screw carried by said block and engaging said impact bar.

In witness whereof I hereunto subscribe my name this 20th day of March, A. D. 1920.

ALLAN L. McGREGOR.